United States Patent
Chhajed

(10) Patent No.: US 9,022,444 B1
(45) Date of Patent: May 5, 2015

(54) VACUUM NOZZLE HAVING BACK-PRESSURE RELEASE HOLE

(71) Applicant: Western Digital Technologies, Inc., Irvine, CA (US)

(72) Inventor: Parag K. Chhajed, Pune (IN)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/898,327

(22) Filed: May 20, 2013

(51) Int. Cl.
*B25J 15/06* (2006.01)

(52) U.S. Cl.
CPC .................................. *B25J 15/0616* (2013.01)

(58) Field of Classification Search
USPC ............ 294/183, 186, 189, 213, 902; 269/21, 269/20; 29/743, 760; 901/40
See application file for complete search history.

(56) References Cited

U.S. PATENT DOCUMENTS

| | | | |
|---|---|---|---|
| 3,843,183 A * | 10/1974 | Hutson ........................ | 294/186 |
| 3,999,795 A | 12/1976 | Barker | |
| 4,557,514 A | 12/1985 | Cushman et al. | |
| 4,750,768 A | 6/1988 | Kumar | |
| 4,903,717 A | 2/1990 | Sumnitsch | |
| 4,925,225 A | 5/1990 | Dost | |
| 5,207,465 A | 5/1993 | Rich | |
| 5,308,132 A * | 5/1994 | Kirby et al. ................... | 294/185 |
| 5,324,087 A | 6/1994 | Shimose et al. | |
| 5,470,420 A | 11/1995 | Yokajty | |
| 5,727,922 A * | 3/1998 | Ikeya et al. ................ | 414/752.1 |
| 5,818,658 A * | 10/1998 | Balster et al. .................. | 360/75 |
| 5,915,915 A | 6/1999 | Allen et al. | |
| 6,039,371 A | 3/2000 | Smith | |
| 6,049,973 A | 4/2000 | Frank, Jr. et al. | |
| 6,082,605 A | 7/2000 | Farnworth | |
| 6,085,410 A * | 7/2000 | Toensing et al. ................ | 29/758 |
| 6,139,078 A | 10/2000 | Bodiker, II et al. | |
| 6,163,950 A | 12/2000 | Bodiker, II et al. | |
| 6,328,362 B1 * | 12/2001 | Isogai et al. ................... | 294/185 |
| 6,336,266 B1 | 1/2002 | Kobayashi et al. | |
| 6,439,559 B1 | 8/2002 | Kinnard et al. | |
| 6,467,153 B2 | 10/2002 | Butts et al. | |
| 6,601,948 B1 | 8/2003 | Zhang | |
| 6,651,192 B1 | 11/2003 | Viglione et al. | |
| 6,657,801 B1 | 12/2003 | Chue et al. | |
| 6,663,092 B2 | 12/2003 | Kashiwazaki et al. | |
| 6,687,093 B1 | 2/2004 | Butler et al. | |
| 6,751,041 B1 | 6/2004 | Codilian et al. | |
| 6,788,480 B1 | 9/2004 | Codilian et al. | |
| 6,791,782 B1 | 9/2004 | Codilian et al. | |
| 6,792,669 B2 | 9/2004 | Codilian | |
| 6,798,592 B1 | 9/2004 | Codilian et al. | |
| 6,894,861 B1 | 5/2005 | Codilian et al. | |
| 6,897,393 B1 | 5/2005 | Codilian et al. | |
| 6,898,044 B1 | 5/2005 | Chheda | |
| 6,943,972 B1 | 9/2005 | Chue et al. | |
| 7,003,626 B1 | 2/2006 | Chheda et al. | |
| 7,027,242 B1 | 4/2006 | Terrill et al. | |

(Continued)

*Primary Examiner* — Paul T Chin

(57) ABSTRACT

A pick-and-place vacuum nozzle including a a nozzle body, a vacuum chamber within the nozzle body, a cavity formed in a lower surface of the nozzle body below the vacuum chamber, wherein the cavity is shaped to hold a head gimbal assembly, a back pressure relief hole passing through the nozzle body and connected to the vacuum chamber, the back pressure relief hole communicating with an exterior of the nozzle body, wherein a diameter of the back pressure relief hole is between 0.5 mm and 1 mm. The backpressure relief hole prevents light parts from sticking to the nozzle tip after vacuum is no longer applied.

11 Claims, 2 Drawing Sheets

(56) References Cited

U.S. PATENT DOCUMENTS

| | | | |
|---|---|---|---|
| 7,046,467 | B1 | 5/2006 | Chheda |
| 7,058,759 | B1 | 6/2006 | Reiser et al. |
| 7,072,129 | B1 | 7/2006 | Cullen et al. |
| 7,076,391 | B1 | 7/2006 | Pakzad et al. |
| 7,076,603 | B1 | 7/2006 | Chheda |
| 7,086,675 | B2* | 8/2006 | Jacobs ............................ 294/2 |
| 7,136,242 | B1 | 11/2006 | Chue et al. |
| 7,139,145 | B1 | 11/2006 | Archibald et al. |
| 7,145,744 | B1 | 12/2006 | Clawson et al. |
| 7,178,432 | B1 | 2/2007 | Han et al. |
| 7,199,959 | B1 | 4/2007 | Bryant |
| 7,203,020 | B1 | 4/2007 | Viglione et al. |
| 7,209,310 | B1 | 4/2007 | Tsai et al. |
| 7,222,410 | B1 | 5/2007 | Klassen et al. |
| 7,236,911 | B1 | 6/2007 | Gough et al. |
| 7,269,525 | B1 | 9/2007 | Gough et al. |
| 7,281,741 | B2 | 10/2007 | Woodruff et al. |
| 7,409,812 | B2 | 8/2008 | Gilmore et al. |
| 7,458,282 | B1 | 12/2008 | Wuester, Sr. et al. |
| 7,490,398 | B1 | 2/2009 | Klassen et al. |
| 7,506,553 | B1 | 3/2009 | Panyavoravaj |
| 7,549,204 | B1 | 6/2009 | Vangal-Ramamurthy et al. |
| 7,552,526 | B1 | 6/2009 | Klassen et al. |
| 7,559,590 | B1 | 7/2009 | Jones |
| 7,561,416 | B1 | 7/2009 | Sarraf |
| 7,596,722 | B1 | 9/2009 | Pakzad et al. |
| 7,634,375 | B1 | 12/2009 | Pakzad et al. |
| 7,653,983 | B1 | 2/2010 | Klassen |
| 7,669,711 | B1 | 3/2010 | Westwood |
| 7,671,599 | B1 | 3/2010 | Tan et al. |
| 7,673,638 | B1 | 3/2010 | Boynton et al. |
| 7,690,705 | B1 | 4/2010 | Roberts et al. |
| 7,743,486 | B1 | 6/2010 | Klassen et al. |
| 7,863,889 | B1 | 1/2011 | Bamrungtham |
| 7,869,182 | B1 | 1/2011 | Tan et al. |
| 7,869,183 | B1 | 1/2011 | Tan et al. |
| 7,874,424 | B1 | 1/2011 | Westwood |
| 7,896,218 | B2 | 3/2011 | Rakpongsiri et al. |
| 7,900,272 | B1 | 3/2011 | Tan et al. |
| 7,912,666 | B1 | 3/2011 | Pakzad et al. |
| 7,916,599 | B1 | 3/2011 | Panyavoravaj et al. |
| 7,921,543 | B2 | 4/2011 | Trongjitwikrai et al. |
| 7,940,487 | B1 | 5/2011 | Krishnan et al. |
| 7,974,038 | B2 | 7/2011 | Krishnan et al. |
| 7,980,159 | B1 | 7/2011 | Han |
| 7,987,585 | B1 | 8/2011 | Klassen et al. |
| 8,066,171 | B1 | 11/2011 | Rakpongsiri et al. |
| 8,078,421 | B1 | 12/2011 | Shastry et al. |
| 8,092,610 | B1 | 1/2012 | Tarrant |
| 8,094,414 | B1 | 1/2012 | Cheng et al. |
| 8,098,460 | B1 | 1/2012 | Jen et al. |
| 8,127,643 | B1 | 3/2012 | Tan |
| 8,135,208 | B1 | 3/2012 | Vangal-Ramamurthy |
| 8,162,366 | B1* | 4/2012 | Tan et al. ....................... 294/213 |
| 8,168,033 | B1 | 5/2012 | Mohamad Nor |
| 8,180,487 | B1 | 5/2012 | Vangal-Ramamurthy et al. |
| 8,199,425 | B1 | 6/2012 | Gustafson et al. |
| 8,218,256 | B1 | 7/2012 | Lin et al. |
| 8,223,448 | B1 | 7/2012 | Haw et al. |
| 8,230,570 | B1 | 7/2012 | Choong |
| 8,245,601 | B1 | 8/2012 | Hastama et al. |
| 8,267,831 | B1 | 9/2012 | Olsen et al. |
| 8,270,118 | B1 | 9/2012 | Cheng et al. |
| 8,300,338 | B1 | 10/2012 | McFadyen |
| 8,307,537 | B1 | 11/2012 | Klassen et al. |
| 8,312,585 | B1 | 11/2012 | Tarrant |
| 8,322,235 | B1 | 12/2012 | Keopuang et al. |
| 8,327,529 | B1 | 12/2012 | Tan et al. |
| 8,335,049 | B1 | 12/2012 | Liu et al. |
| 8,345,367 | B1 | 1/2013 | Tharumalingam |
| 8,356,384 | B1 | 1/2013 | Ferre et al. |
| 8,369,073 | B2 | 2/2013 | Trinh et al. |
| 8,379,363 | B1 | 2/2013 | Kolunthavelu et al. |
| 8,387,631 | B1 | 3/2013 | Thonghara et al. |
| 8,424,418 | B1 | 4/2013 | Wuester, Sr. et al. |
| 8,424,824 | B1 | 4/2013 | Tan et al. |
| 8,432,630 | B1 | 4/2013 | Lin et al. |
| 8,432,631 | B1 | 4/2013 | Lin et al. |
| 8,447,430 | B1 | 5/2013 | Tan et al. |
| 8,447,551 | B1 | 5/2013 | Ong et al. |
| 8,451,578 | B1 | 5/2013 | Tan et al. |
| 8,453,841 | B1 | 6/2013 | James et al. |
| 8,454,755 | B1* | 6/2013 | Tan et al. ..................... 29/603.03 |
| 8,485,579 | B2 | 7/2013 | Roajanasiri et al. |
| 8,485,772 | B1 | 7/2013 | Ismail et al. |
| 8,493,681 | B1 | 7/2013 | Selvaraj |
| 8,537,480 | B1 | 9/2013 | Haw |
| 8,544,164 | B1 | 10/2013 | Cheng et al. |
| 8,547,657 | B1 | 10/2013 | Liu et al. |
| 8,553,968 | B1 | 10/2013 | Lee et al. |
| 8,561,285 | B1 | 10/2013 | Vangal-Ramamurthy et al. |
| 8,565,511 | B1 | 10/2013 | Sungkhaphong et al. |
| 8,582,229 | B1 | 11/2013 | Krishnan |
| 8,596,107 | B1 | 12/2013 | Wongdao et al. |
| 8,605,383 | B1 | 12/2013 | Wang et al. |
| 8,640,328 | B1 | 2/2014 | Yow et al. |
| 8,650,716 | B1 | 2/2014 | Methe et al. |
| 8,653,824 | B1 | 2/2014 | Liu et al. |
| 8,662,554 | B1* | 3/2014 | Srisupun et al. .............. 294/186 |
| 8,683,676 | B1* | 4/2014 | Wuester et al. ............... 269/903 |
| 8,689,433 | B1 | 4/2014 | Choong |
| 8,707,531 | B1 | 4/2014 | Sungkhaphong et al. |
| 8,713,333 | B1 | 4/2014 | Selvaraj |
| 8,763,790 | B1 | 7/2014 | Neamsuwan et al. |
| 8,789,446 | B1 | 7/2014 | Sungkhaphong et al. |
| 8,811,135 | B1 | 8/2014 | Kasino et al. |
| 2001/0040327 | A1 | 11/2001 | Kashiwazaki et al. |
| 2004/0140342 | A1* | 7/2004 | Yao et al. ................... 228/235.1 |
| 2008/0084630 | A1 | 4/2008 | Trongjitwikrai et al. |
| 2008/0309910 | A1 | 12/2008 | Takahashi |
| 2009/0157848 | A1 | 6/2009 | Khoo |
| 2010/0108256 | A1 | 5/2010 | Roajanasiri et al. |
| 2013/0007617 | A1 | 1/2013 | Mackenzie et al. |
| 2013/0027612 | A1 | 1/2013 | Miloseski et al. |
| 2013/0057986 | A1 | 3/2013 | Vangal-Ramamurthy et al. |
| 2013/0102230 | A1* | 4/2013 | Komatsu et al. ............. 294/183 |
| 2013/0248545 | A1 | 9/2013 | Thongjitti et al. |

\* cited by examiner

VACUUM NOZZLE HAVING BACK-PRESSURE RELEASE HOLE

TECHNICAL FIELD

This disclosure relates to the field of hard drive manufacturing and more specifically, pick and place vacuum nozzles.

BACKGROUND

During hard drive manufacturing, a vacuum nozzle is used to pick and place head gimbal assemblies (HGAs). A vacuum nozzle tip is placed on the HGA and a vacuum pump is activated to apply a vacuum to hold the HGA to the nozzle tip. After the HGA is moved, the vacuum is released to allow the HGA to fall from the nozzle tip. Typically, gravity is sufficient to cause the HGA to fall from the tip. However, in some cases, sufficient vacuum remains after the vacuum pump has been turned off that that HGA remains on the tip. If this occurs, the HGA must be removed manually from the tip, risking damage. Alternatively, compressed air may be used to remove the HGA, risking contamination.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

Figure 1A:
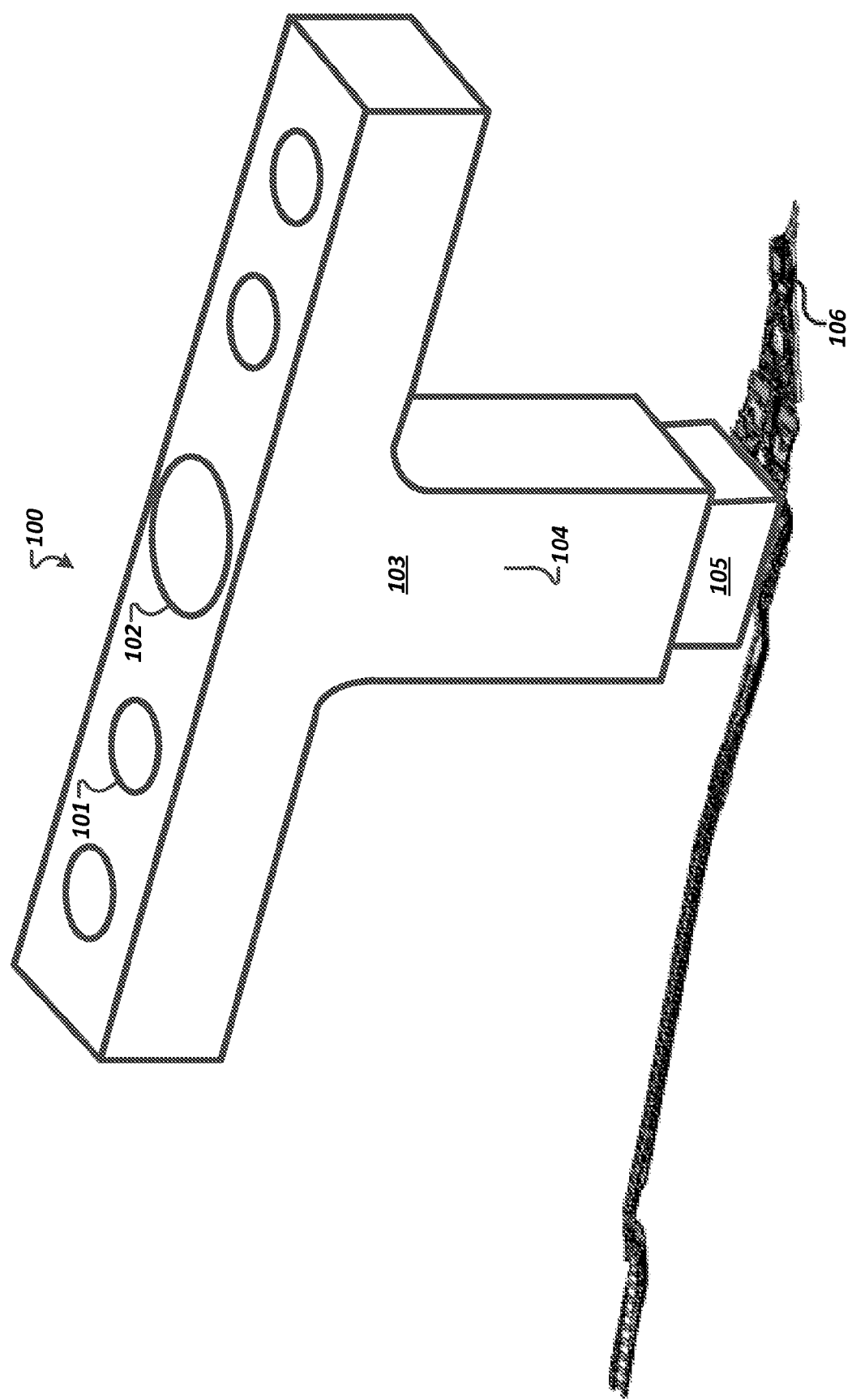
FIGS. 1A and 1B illustrate a vacuum nozzle having a back-pressure release hole.
Figure 1B:
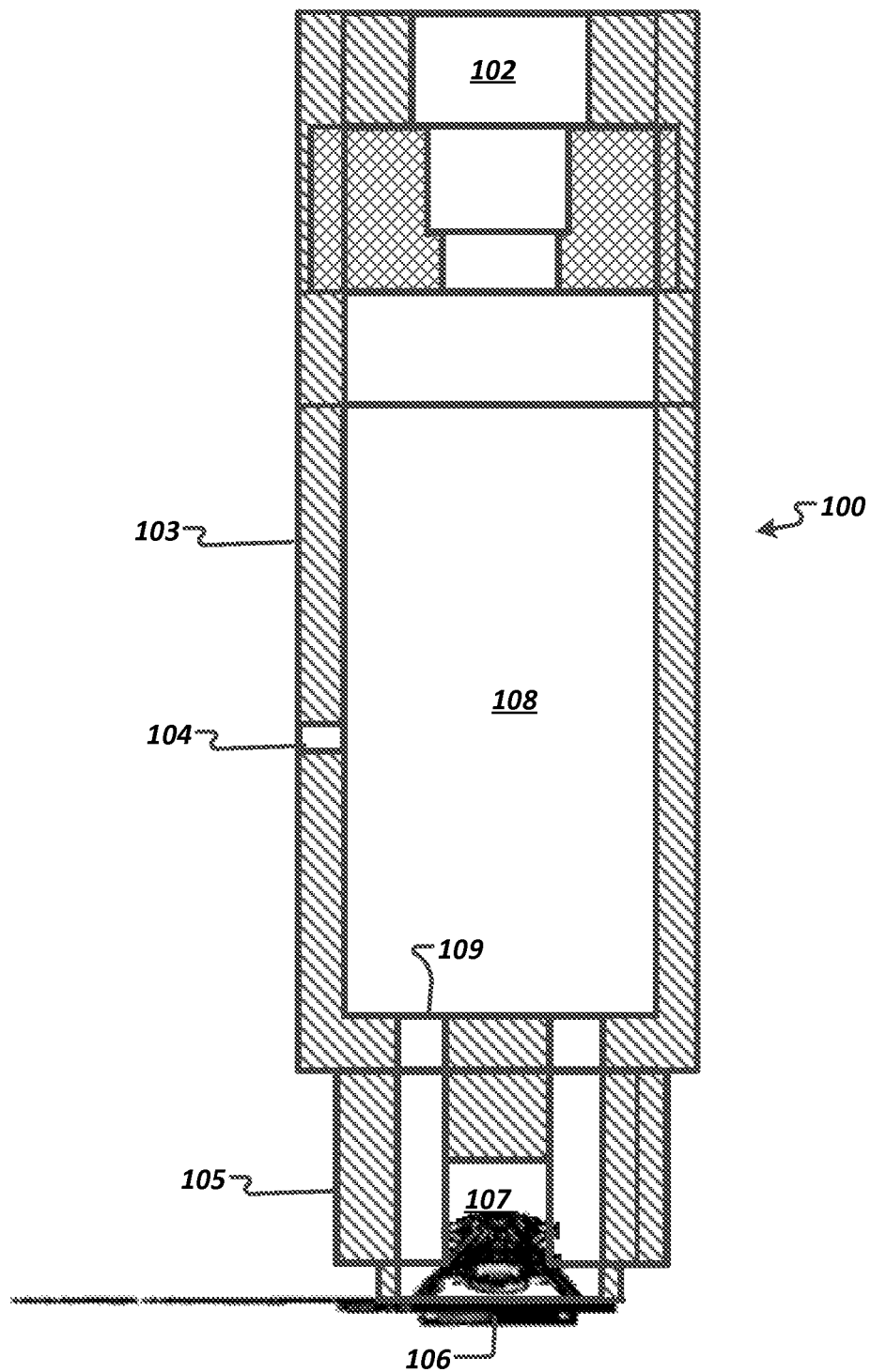

FIGS. 1A and 1B illustrate a vacuum nozzle having a back-pressure relief hole. The vacuum nozzle 100 comprises a vacuum nozzle body 103, and a vacuum nozzle tip 105 coupled to the vacuum nozzle body 103.

The vacuum nozzle body 103 comprises a vacuum port 102 shaped to connect to a vacuum pump and a hole 104 in the nozzle body 103. The nozzle body 103 further comprises a plurality of mounting location 101, shaped to allow the nozzle 100 to be connected to a pick and place machine. The nozzle body 103 houses a vacuum chamber 108 within the body 103. The vacuum chamber 108 is in fluid communication with the vacuum port 102.

The vacuum nozzle tip 105 is coupled to the vacuum nozzle body 103 and comprise a nozzle tip cavity 107 and two nozzle vessels 109. The vessels 109 fluidly couple the nozzle tip cavity 107 to the vacuum chamber 108. The nozzle tip cavity 107 is shaped to hold the part 106 that the nozzle 100 is used to pick and place. For example, in the illustrated embodiment, the part 106 is a head gimbal assembly (HGA) for a hard disk drive.

During operation, the vacuum nozzle tip 105 is placed over the part 106 such that the nozzle tip cavity 107 surrounds the part 106. A vacuum is applied to the vacuum port 102 using a vacuum pump, holding the part 106 to the tip 105. The vacuum nozzle 100 is then used to move the part 106 to another location. Once at the new location, the vacuum pump is turned off to release the part 106.

Although the vacuum pump is turned off, the pressure inside chamber 108 may remain sufficiently lower than ambient pressure that the part 106 remains in the cavity 107. In these cases, ambient air flows through the hole 104 into chamber 108 to equalize the pressure between chamber 108 and the ambient atmosphere. Once the pressure in the chamber 108 has sufficiently increased, the part 106 falls from the cavity 107 under the force of gravity.

Accordingly, the hole 104 is sized small enough that sufficiently low pressure may be maintained in the chamber 108 while the pump is turned on. The hole 104 is sized large enough that pressure equalizes in an acceptable time frame. For example, embodiments where the vacuum pressure is 7 l/sec to pick and place HGAs, a hole 104 having a diameter between 1 mm and 0.5 mm may be used. In further embodiments, the hole 104 has a diameter between 0.7 and 0.9 mm. In a particular embodiment, the hole has a diameter of 0.8 mm.

In some embodiments, the hole 104 is in the nozzle 100 at a location unlikely to be contacted during nozzle use. For example, in some applications, the tip 105 may come into contact with other bodies, which might scratch the hole 104 and increase its size. Accordingly, in some embodiments, the hole 104 is located within 25% of the height of the body 103 from the center of the body 103. In a particular embodiment, the hole is located at the center of the body 103.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A vacuum nozzle, comprising:
   a nozzle body;
   a vacuum chamber within the nozzle body;
   a cavity formed in a lower surface of the nozzle body below the vacuum chamber, wherein the cavity is shaped to hold a head gimbal assembly;
   a back pressure relief hole passing through the nozzle body and connected to the vacuum chamber, the back pressure relief hole communicating with an exterior of the nozzle body;
   wherein a diameter of the back pressure relief hole is between 0.5 mm and 1 mm.

2. The vacuum nozzle of claim 1, further comprising:
   a vacuum port passing through the body and connected to the vacuum chamber.

3. The vacuum nozzle of claim 1, further comprising:
   a nozzle tip disposed in the lower surface of the nozzle body proximate to the cavity and connected to the vacuum chamber.

4. The vacuum nozzle of claim 1, wherein the diameter of the back pressure relief hole is between 0.7 mm and 0.9 mm.

5. A method, comprising:
   picking up a head gimbal assembly using a cavity by applying a vacuum to a vacuum chamber within a vacuum nozzle body, the cavity being shaped to hold the head gimbal assembly and connected to the vacuum chamber;
   ceasing to apply the vacuum to the vacuum chamber; and
   releasing the part by allowing pressure in the vacuum chamber to increase by gas entering a back pressure relief hole passing through the nozzle body and connected to the vacuum chamber, the back pressure relief hole communicating with an exterior of the nozzle body;
wherein a diameter of the back pressure relief hole is between 0.5 mm and 1 mm.

6. The method of claim 5, wherein the vacuum is applied using a vacuum port passing through the body and connected to the vacuum chamber.

7. The method of claim 5, wherein the diameter of the back pressure relief hole is between 0.7 mm and 0.9 mm.

8. A vacuum nozzle; comprising:
a nozzle body;
a vacuum chamber within the nozzle body;
a cavity formed in a lower surface of the nozzle body below the vacuum chamber, wherein the cavity is shaped to hold a head gimbal assembly; and
a means for allowing a pressure inside the vacuum chamber to increase after discontinuation of application of a vacuum to the vacuum chamber, wherein the means for allowing a pressure communicates with an exterior of the nozzle body;
wherein a diameter of the means for allow a pressure is between 0.5 mm and 1 mm.

9. The vacuum nozzle of claim 8, wherein the means passes through the nozzle body.

10. The vacuum nozzle of claim 9, further comprising:
a vacuum port passing through the body and connected to the vacuum chamber.

11. The vacuum nozzle of claim 9, further comprising:
a nozzle tip disposed in the lower surface of the nozzle body proximate to the cavity and connected to the vacuum chamber.

\* \* \* \* \*